D. WIMPFHEIMER.
Making Vinegar.
No. 156,617. Patented Nov. 3, 1874.
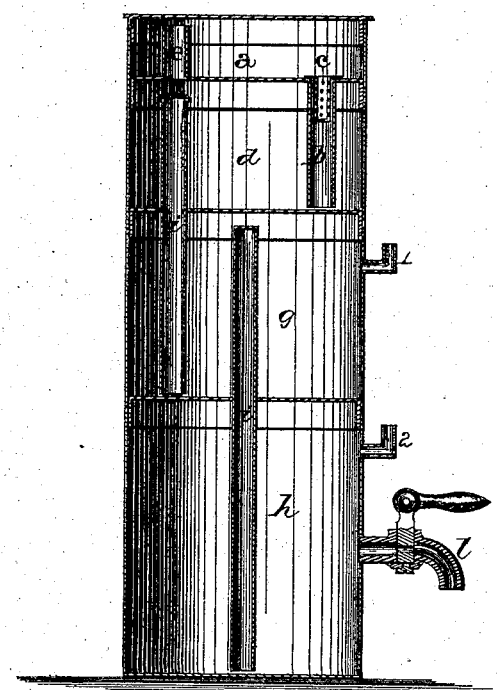
WITNESSES.
INVENTOR

UNITED STATES PATENT OFFICE.

DAVID WIMPFHEIMER, OF NEW YORK, N. Y.

IMPROVEMENT IN MAKING VINEGAR.

Specification forming part of Letters Patent No. 156,617, dated November 3, 1874; application filed October 10, 1874.

*To all whom it may concern:*

Be it known that I, DAVID WIMPFHEIMER, of the city of New York, in the county of New York and State of New York, have invented certain new and useful Improvements in Making Vinegar; and I do hereby declare the following to be a full, clear, and exact description of the invention, such as will enable others skilled in the art to which it pertains to make and use it, reference being had to the accompanying drawings, which form part of this specification.

My invention relates to an improvement in an apparatus for making vinegar; and it consists of a series of tubs or vessels, one placed above the other, the upper one of which receives the mash, while those just below are filled with some non-conducting substances, through which the fluid is passed in order to produce acetic acid or vinegar. The lower one of the tubs receives the vinegar after it has passed through the non-conductors, from which it can be drawn at will.

The accompanying drawings represent my invention.

$a$ represents the upper and smaller one of a series of tubs or vessels, in which is placed the mash, consisting of fermented beer, wine, cider, whisky, or other alcoholic substances. From the bottom of this tub hangs a pipe, $b$, in the top of which is placed a suitable strainer, $c$, to prevent solid matter from passing down into the tub $d$ just below. From the bottom of this tub $a$ also rises another tube, $e$, which reaches almost to the top of the tub, and through which all the surplusage of the fluid pours in case the tub should be overfilled. Just under the tub $d$ are the two tubs $g$ $h$, one fitting into the top of the other, in each of which is placed a tube, $i$, having its top covered by a suitable strainer. These tubes extend from up near the tops of the tubs in which they are placed, down near the bottom of the tub just below, their tops being intended to reach up above the non-conducting material with which the tubs are to be nearly filled, so as to carry off the fluid to the tub below as rapidly as it rises to the top of the tub through the non-conducting material. This non-conducting material may consist of charcoal, shavings, cork parings, &c., and serves to turn the liquid into vinegar. The lower one, $h$, of the series of the tubs receives the vinegar after it has passed the non-conductors, and is provided with a suitable cock, $l$, some distance above the bottom, through which the contents are drawn off. Near the tops of the two tubs $h$ $g$ are placed small glass gages 1 2, which serve both to admit air into the tubs and to show the condition of the liquid within them.

There may be either a larger or a smaller number of these tubs, as desired, and they may be constructed as here shown, or in any other way that may be preferred.

Having thus described my invention, I claim—

The combination of the vessels $a$ $d$ $g$ $h$, overflow-tube $e$, connecting-tubes $b$ $i$, provided with suitable strainers and having their ends extending down to the bottom of the filtering material, tube $i$, test-tubes 1 2, and cock $l$, substantially as shown and described.

In testimony that I claim the foregoing I have hereunto set my hand this 5th day of October, 1874.

DAVID WIMPFHEIMER.

Witnesses:
EDWARD SELLECK,
BRENT BARINN.